US012574333B2

(12) United States Patent
Hencinski et al.

(10) Patent No.: US 12,574,333 B2
(45) Date of Patent: Mar. 10, 2026

(54) MULTI RADIO MEDIA ACCESS CONTROL FOR ULTRA-LOW AND BOUNDED DELAY

(71) Applicant: Huawei Technologies Co., Ltd., Shenzhen (CN)

(72) Inventors: Oren Hencinski, Hod Hasharon (IL); Ohad Klausner, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/544,060

(22) Filed: Dec. 7, 2021

(65) Prior Publication Data

US 2022/0109638 A1      Apr. 7, 2022

Related U.S. Application Data

(63) Continuation of application No. PCT/EP2019/066843, filed on Jun. 25, 2019.

(51) Int. Cl.
H04L 47/62 (2022.01)
H04L 47/34 (2022.01)
(Continued)

(52) U.S. Cl.
CPC ............ H04L 47/621 (2013.01); H04L 47/34 (2013.01); H04W 28/04 (2013.01); H04W 28/06 (2013.01);
(Continued)

(58) Field of Classification Search
CPC ..... H04L 47/621; H04L 47/41; H04L 47/624; H04W 28/082
See application file for complete search history.

(56) References Cited

U.S. PATENT DOCUMENTS

2009/0063804 A1* 3/2009 Trainin ............. H04W 72/0446
                                                      711/170
2009/0228619 A1* 9/2009 Trainin ................... H04L 47/18
                                                      710/56
(Continued)

FOREIGN PATENT DOCUMENTS

CN          105432047 A      3/2016

OTHER PUBLICATIONS

SanjayGoyaletal. "OnthePacketAllocationofMulti-BandAg-gregationWirelessNetworks", arXiv:1508.05017v3[cs.NI]May 3, 2017,14pages. (Year: 2017).*
(Continued)

*Primary Examiner* — Derrick W Ferris
*Assistant Examiner* — Won Jun Choi
(74) *Attorney, Agent, or Firm* — Conley Rose, P.C.

(57) ABSTRACT

A multi radio media access control (MAC) (MRM) transceiver includes a plurality of transceiver systems, each transceiver system assigned a different MAC address, and a memory configured to aggregate, in a shared queue, a plurality of packets of a data stream received via a computer network. Each of the transceiver systems is configured to asynchronously acquire one or more of the packets from the shared queue for transmission in one of a plurality of transmission channels. Each one of the transmission channels comprises a different frequency. The transmission channels are maintained for simultaneous transmission of the one or more packets to a common target user equipment (UE) that is wirelessly coupled to the MRM transceiver.

20 Claims, 11 Drawing Sheets

(51) Int. Cl.

| | |
|---|---|
| *H04W 28/04* | (2009.01) |
| *H04W 28/06* | (2009.01) |
| *H04W 72/12* | (2023.01) |
| *H04W 28/02* | (2009.01) |
| *H04W 80/02* | (2009.01) |

(52) U.S. Cl.
CPC ........ *H04W 72/12* (2013.01); *H04W 28/0268* (2013.01); *H04W 80/02* (2013.01)

(56) References Cited

U.S. PATENT DOCUMENTS

| | | | | |
|---|---|---|---|---|
| 2010/0014448 | A1* | 1/2010 | Wentink | H04L 1/1685 |
| | | | | 370/311 |
| 2010/0138714 | A1 | 6/2010 | Sorbara et al. | |
| 2011/0197201 | A1* | 8/2011 | Yoo | G06F 9/544 |
| | | | | 719/313 |
| 2011/0305170 | A1* | 12/2011 | Lai | H04L 12/1827 |
| | | | | 370/352 |
| 2014/0359160 | A1 | 12/2014 | Elhaddad et al. | |
| 2015/0264685 | A1* | 9/2015 | Adachi | H04W 72/0446 |
| | | | | 370/329 |
| 2016/0105888 | A1* | 4/2016 | Seok | H04W 16/10 |
| | | | | 370/329 |
| 2017/0193711 | A1* | 7/2017 | Lenchner | G06F 3/167 |
| 2017/0311204 | A1* | 10/2017 | Cariou | H04W 28/085 |
| 2018/0042026 | A1* | 2/2018 | Chang | H04W 72/54 |
| 2018/0376374 | A1* | 12/2018 | Trainin | H04L 1/0001 |
| 2019/0150214 | A1* | 5/2019 | Zhou | H04W 76/15 |
| | | | | 370/329 |

OTHER PUBLICATIONS

Sanjay Goyal et al., "On the Packet Allocation of Multi-Band Aggregation Wireless Networks", arXiv:1508.05017v3 [cs.NI] May 3, 2017, 14 pages.

John Son et al.,"Experiments on Wireless VR for EHT", IEEE 802.11-18/1606r0, Sep. 10, 2018, 12 pages.

Abhishek Patil et al., "Multi-Link Aggregation", doc.: IEEE 802. 11-19/0000r0, Mar. 2019, 13 pages.

Liwen Chu et al., "Multiple Band Operation Discussion", IEEE 802.11-19/XXXXr0, Mar. 1, 2019, 7 pages.

Sergey Andreev et al., "Intelligent Access Network Selection in Converged Multi-Radio Heterogeneous Networks", IEEE Wireless Communications, Dec. 2014, 11 pages.

Allen Miu et al., "Improving Loss Resilience with Multi-Radio Diversity in Wireless Networks", Computer and Communication Sciences, Aug. 28-Sep. 2, 2005, 15 pages.

* cited by examiner

| | 150Mbps-0% | 150Mbps-10% | 150Mbps-15% |
|---|---|---|---|
| VR SINGLE CHANNEL | 97.46% | 38.48% | 8.55% |
| VR MULTI CHANNEL DUPLICATE | 98.94% | 49.85% | 12.89% |
| VR MULTI RADIO MAC | 99.81% | 98.63% | 97.19% |

| | 200Mbps-0% | 200Mbps-10% | 200Mbps-15% |
|---|---|---|---|
| VR SINGLE CHANNEL | 89.29% | 18.59% | 5.79% |
| VR MULTI CHANNEL DUPLICATE | 92.27% | 24.93% | 8.49% |
| VR MULTI RADIO MAC | 99.19% | 97.95% | 95.29% |

INTERFERENCE 200Mbps PER(0-15%) VS. VR PACKET PERCENTAGE DELAY <10ms

PACKET % DELAY <10ms 100.00 90.00 80.00 70.00 60.00 50.00 40.00 30.00 20.00 10.00 0.00

| | 300Mbps-0% | 300Mbps-10% | 300Mbps-15% |
|---|---|---|---|
| VR SINGLE CHANNEL | 76.94% | 9.86% | 4.25% |
| VR MULTI CHANNEL DUPLICATE | 78.49% | 12.89% | 5.87% |
| VR MULTI RADIO MAC | 98.93% | 96.85% | 92.36% |

MULTI RADIO MEDIA ACCESS CONTROL FOR ULTRA-LOW AND BOUNDED DELAY

CROSS-REFERENCE TO RELATED APPLICATIONS

This application is a continuation of International Patent Application No. PCT/EP2019/066843 filed on Jun. 25, 2019, which is hereby incorporated by reference in its entirety.

BACKGROUND

The present disclosure, in some embodiments thereof, relates to multi radio media access control (MAC) (MRM), and, in particular, but not exclusively, to methods and systems for assuring quality of service (QoS) using MRM based devices.

Wireless protocols, such as the Institute of Electrical and Electronics Engineers (IEEE) 802.11x protocols, are based on carrier-sense multiple access (CSMA) with collision avoidance (CA) (CSMA/CA) methods. By definition, avoiding collision amounts to time sharing forcing one device waiting for other device's transmission to end before starting transmitting, causing thus an unknown delay before each transmission. Hence, QoS is not assured as accurate transmission timing cannot be guaranteed.

To mitigate this issue, IEEE 802.11e standard provides QoS support for wireless local area network (WLAN). The QoS support, referred to as enhanced distributed channel access (EDCA), is a mandatory mode for MAC in the IEEE 802.11e standard and assures that high-priority traffic has a higher chance of being sent than low-priority traffic (there are four priority categories), with the effect that a station with high priority traffic waits a little less before it sends its packet, on average, than a station with low priority traffic. Still, in IEEE 802.11e standard each priority category differs only by the random back-off window which provides statistically higher priority to low latency traffic on top of other traffic. While 802.11e takes into account a required delay per application, when multiple access points (APs) share transmissions with common priority, for instance video and/or voice streams, time sharing interference remains a delay forming factor.

SUMMARY

According to a first aspect of the disclosure there is provided an MRM transceiver that includes a plurality of transceiver modules each assigned with a different MAC address and a memory adapted for aggregating in a shared queue a plurality of packets of a stream data received via a computer network. Each of the plurality of transceiver modules is adapted to acquire asynchronously one or more of the plurality of packets from the shared queue for transmission in one of a plurality of transmission channels. Each one of the plurality of transmission channels is having a different frequency. The plurality of transmission channels is maintained for simultaneous transmission to a common target station, such as a user equipment, that is wirelessly connected to the MRM transceiver.

According to a second aspect of the disclosure there is provided a user equipment (UE) adapted to be connected to a wireless network via an MRM transceiver. The UE includes a plurality of transceiver modules each assigned with a different MAC address for establishing separately one of a plurality of transmission channels with the MRM transceiver, the plurality of transmission channels is maintained simultaneously. The UE includes further a memory adapted for storing and optionally reordering a plurality of packets of stream data in a shared queue. Each of the plurality of transceiver modules is adapted to asynchronously acquire one or more of the plurality of packets via a respective of the plurality of transmission channels and add the one or more packets to the shared queue. Each one of the plurality of transmission channels is having a different frequency.

According to a third aspect of the disclosure there is provided a method of operating an MRM transceiver. The method is based on receiving via a computer network a plurality of packets of a stream data and aggregating them in a shared queue, operating a plurality of transceiver modules of the MRM transceiver to maintain simultaneously a plurality of transmission channels with a common target user equipment which is wirelessly connected to the MRM transceiver, each one of the plurality of transmission channels having a different frequency, and operating a plurality of transceiver modules to acquire asynchronously one or more of the plurality of packets from the shared queue for a parallel transmission in the plurality of transmission channels.

According to a fourth aspect of the disclosure there is provided a method of operating a UE connected to a wireless network via an MRM transceiver. The method is based on using a plurality of transceiver modules each assigned with a different MAC address for establishing separately one of a plurality of transmission channels with the MRM transceiver, the plurality of transmission channels are maintained simultaneously and having different frequencies, operating each of the plurality of transceiver modules to acquire asynchronously one or more of a plurality of packets via a respective of the plurality of transmission channels, and aggregating the plurality of packets of stream data in a shared reordering queue.

By implementing any of the above aspects, an MRM device, such as an AP, can transmit to a target station, such as a UE, via one or more wireless transmission channels, while another wireless transmission channel is occupied by devices operating with the same medium access characteristics (e.g. radio frequency, modulation scheme etc.). This allows improving air winning rate and dramatically decreasing unexpected transmission delays, assuring higher service-level agreement (SLA) compliance rates than AP working with a single wireless transmission channel.

According to one possible implementation of the above aspects, each of the plurality of packets has a field encoding an MRM sequence identifier to be decoded by the target station for packet reordering. This allows the receiving target station to reorder packets received asynchronously via different wireless transmission channels.

According to one possible implementation of one or more of the above aspects, each of the plurality of transceiver modules executes an aggregation process for transmission of a group of packets acquired from the shared queue in a common transmission. In such a manner, benefits of an aggregation process, for instance, a MAC protocol data unit (PDU) (MPDU) or aggregate MPDU (A-MPDU), can be achieved.

According to one possible implementation of one or more of the above aspects, each of the plurality of transceiver modules receives over the respective parallel transmission channel messages, indicative of missing packets, and forwards indication thereof to a queue manager of the shared queue. In such a manner, the queue manager can prioritize the missing packets in the queue, preventing a possible further delay at the transmission of this information.

According to one possible implementation of one or more of the above aspects, one of the plurality of transceiver modules retries to acquire, from the shared queue, one or more packets identified as missing by another of the plurality of transceiver modules. In such a manner, packets not transmitted due to interference in one channel are transmitted in other channels without further delay.

According to one possible implementation of one or more of the above aspects, the MRM device includes a processing circuitry adapted to add the missing packets to the front of the shared queue in response to the receipt of the messages. In such a manner, delayed packets are retransmitted faster than subsequent packets of the streamed data.

According to one possible implementation of one or more of the above aspects, the data stream comprises virtual reality data. Virtual reality data requires a known SLA, and the above aspects of the disclosure are used to assure a known SLA, which is suitable for the high baud rate required for a virtual reality experience.

According to one possible implementation of one or more of the above aspects, each of the plurality of packets comprises a WI-FI header complying with 802.11xx protocol. This allows using existing transceiver modules without protocol adaptation.

According to one possible implementation of one or more of the above aspects, one of the plurality of transceiver modules transmits in a frequency of 5 gigahertz (GHz) low band and another of the plurality of transceiver modules transmits in 5 GHz high band.

According to one possible implementation of one or more of the above aspects, one of the plurality of transceiver modules transmits in a frequency of less than 3 GHz and another of the plurality of transceiver modules transmits in a frequency of more than 4 GHz.

According to one possible implementation of one or more of the above aspects, one of the plurality of transceiver further comprises a transceiver module that transmits in a frequency of more than 4 GHz and another of the plurality of transceiver modules that transmits in a frequency of less than 5 GHz.

According to one possible implementation of one or more of the above aspects, the data stream is unduplicated stream data and the plurality of packets are unduplicated packets. The solutions above are not based on duplicating data so redundant storage, commuting, and transmission are avoided.

According to one possible implementation of one or more of the above aspects, the target station, for instance the UE, includes a processing circuitry adapted to reorder the plurality of packets in the shared queue for encoding the stream data.

According to one possible implementation of one or more of the above aspects, each of the plurality of transceiver modules adds the one or more packets to the shared queue while ignoring block acknowledge (BA)window limitations and missing packets.

According to one possible implementation of one or more of the above aspects, each of the plurality of transceiver modules responds to the received packets with a BA dataset indicating received status per packet, the BA dataset is transmitted over the respective parallel transmission channel.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
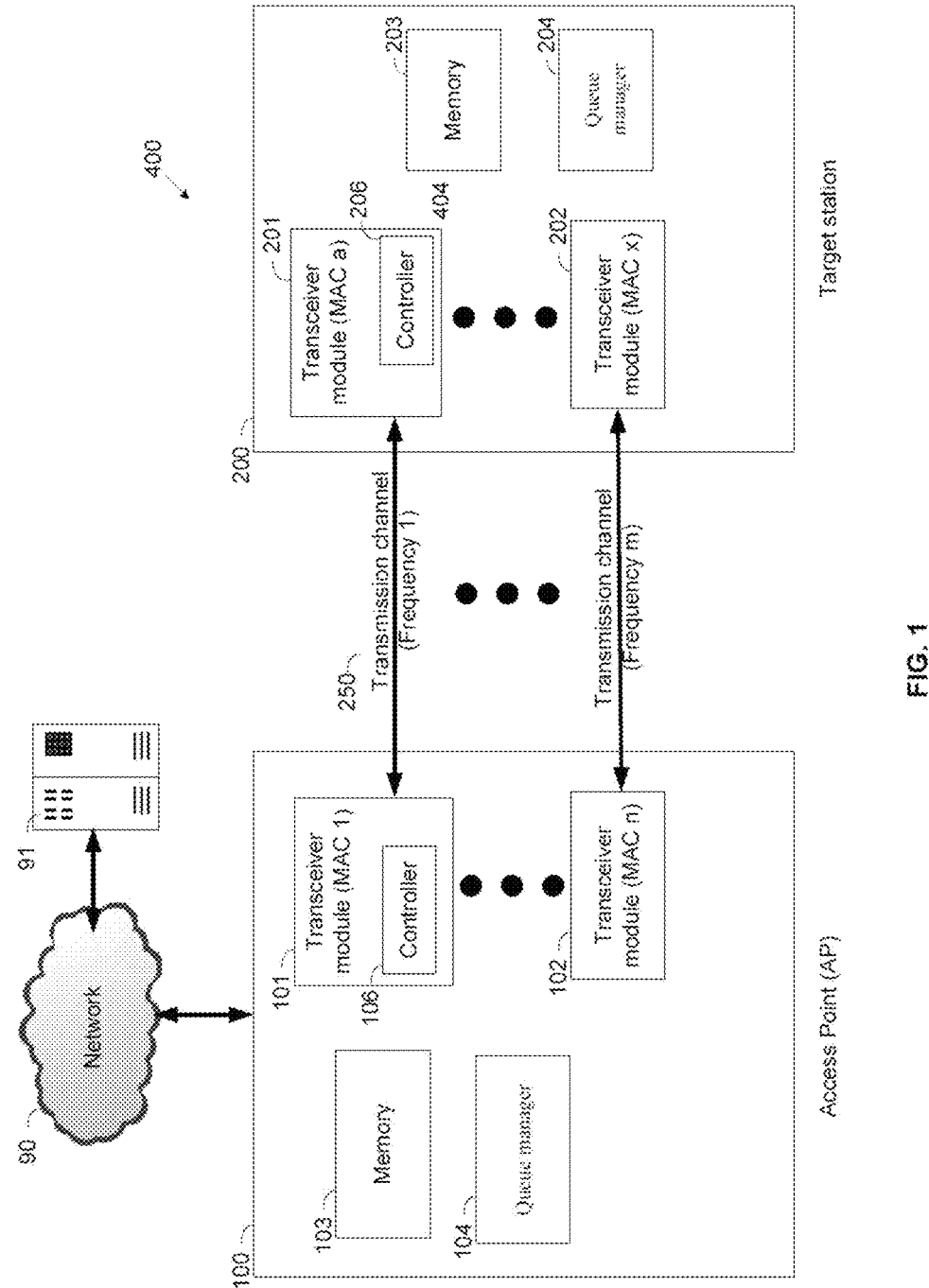
FIG. 1 is a schematic illustration of an MRM device which communicates with a target station such as a UE via multiple transmission channels with different frequencies, according to some embodiments of the present disclosure.

The present disclosure, in some embodiments thereof, relates to MRM and, more particular, but not exclusively, to methods and systems for assuring QoS using MRM based devices.

The overlapping basic service set (BSS) (OBSS) problem refers to situations that two or more BSSs, for example units of devices operating with the same medium access characteristics (i.e., radio frequency, modulation scheme etc.) and unrelated to each other, are operating in the same channel and are close enough to capture transmissions of each other physically. As it easily understood, the OBSS problem may severely degrade the network performance.

Some embodiments of the present disclosure teach an AP with multiple transceiver modules and a controller that operates the transceiver modules according to an MRM layer designed to minimize the effect of OBSS time sharing interference on one wireless communication channel (e.g., 20 and/or 40 and/or 80 megahertz (MHz) and/or 2.4 GHz and/or 5 GHz) by using one or more other wireless communication channels. The layer allows using one or more other wireless communication channels for transmitting to a target UE while a certain channel is affected by high OBSS (e.g., interference above a threshold). Similarly, the process allows transmitting on the certain channel when the one or more other channels are affected by high OBSS. These embodiments improve air winning rate and decrease delay.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of an MRM device 100, such as an AP, which communicates with a target station such as a UE, via multiple transmission channels 250 with different frequencies, according to some embodiments of the present disclosure. For brevity, the MRM device 100 is at a transmitting side and the target station 200 is at a receiving side. The transmission channels 250 wirelessly connect the MRM devices 100, 200 for simultaneous transmission from the MRM device 100 to the other MRM device 200, for instance a target UE.

The MRM device 100 includes multiple transceiver modules 101, 102 and the target station 200 includes multiple transceiver modules 201, 202. A transceiver module is optionally an integrated circuit that includes a network interface controller (NIC), for instance WLAN module, for example IEEE 802.11 radio module. Each of the transceiver modules 101, 102, 201, 202 is assigned with another MAC address. For clarity a MAC address may be referred to as the burned-in address, and is also known as an Ethernet hardware address, hardware address, and physical (PHY) address. Each transceiver module may be implemented by a circuitry executing such that physical layer functions of different PHYs are managed by different transceiver module, optionally executed by the same circuitry.

Optionally, one of the transceiver modules transmits in a frequency of 5 GHz low band and another of the plurality of transceiver modules transmits in 5 GHz high band, for example low 5 GHz and high 5 GHz. Optionally, one of the transceiver modules transmits in a frequency of less than 3 gigahertz and another of the plurality of transceiver modules transmits in a frequency of more than 4 gigahertz, for example 2.4 GHz and 5 GHz. Optionally, one of the transceiver modules further comprises a transceiver module that transmits in a frequency of more than 4 gigahertz and less than 5 gigahertz. Optionally, one of the transceiver modules further comprises a transceiver module that transmits in a high 80 MHz and another that transmits in less a low 80 MHz.

Optionally, each of the transceiver modules includes a controller 106, 206, such as an integrated circuit which includes one or more microprocessors (e.g., although only one controller 106, 206 is depicted each of the multiple transceiver modules 101, 201 and includes a controller). The controller 106, 206 controls the operation of the respective transceiver module.

The MRM device 100 includes a memory 103 adapted for aggregating in a shared queue a plurality of packets of a stream data and a queue manager 104, optionally implemented using a processing circuit, for instance one or more microprocessors. This allows executing logic also referred to herein as an MRM layer. The execution of the MRM layer allows managing data traffic, for instance of data streams, through multiple channels established using the multiple independent MAC addresses and PHYs of the transceiver modules 101.

The target station 200, for instance UE, includes a memory 203 adapted for aggregating the packets received from using the transceiver modules 201 in a shared queue and a queue manager 204, optionally implemented using a processing circuit, for instance one or more microprocessors. This allows retrieving the packets acquired from the multiple transmission channels 250. The queue manager 204 is optionally adapted to reorder the plurality of packets in the shared queue for decoding the stream data.

In operation, when data is streamed using the MRM device 100, each of the MRM devices 100, 200 access the memory 103, 203 to acquire packets aggregated in the shared queue for instance as described below.

While memory 103 aggregates in a shared queue a plurality of packets of a stream data received via a computer network 90, memory 203 aggregates in a shared queue a plurality of packets of a stream data received via the transmission channels 250. Optionally, the packets are originated from a third party, such as a user datagram protocol (UDP) server 91.

For example, the stream data may be virtual or augmented reality stream of data received over a WAN from one or more remote sources such as streaming services.

Optionally, each of the packets of the stream data is encoded with an MRM sequence identifier, for instance in a designated field at the WI-FI™ protocol header and/or in a new packet tag. This allows ordering the packets in the shared queue and/or to allocate them form the shared queue according to the MRM sequence, even when some of the packets are returned to the shared queue by one of the transceiver modules after a failed transmission.

In use, each of the transceiver modules of the transmitting side acquires from the shared queue, optionally independently from the other transceiver modules, packets for transmission in one of the transmission channels 250, for instance based on an operation scheme defined by the controller 106. The packets are optionally acquired asynchronously and/or transmitted asynchronously.

Optionally, each of the multiple transceiver modules 101, 102 independently implements packet aggregation protocol, for instance MPDU or A-MPDU. In such embodiments, multiple packets are acquired from the shared queue for transmission in a transmission session such as a transmission opportunity (TxOP).

Figure 2:
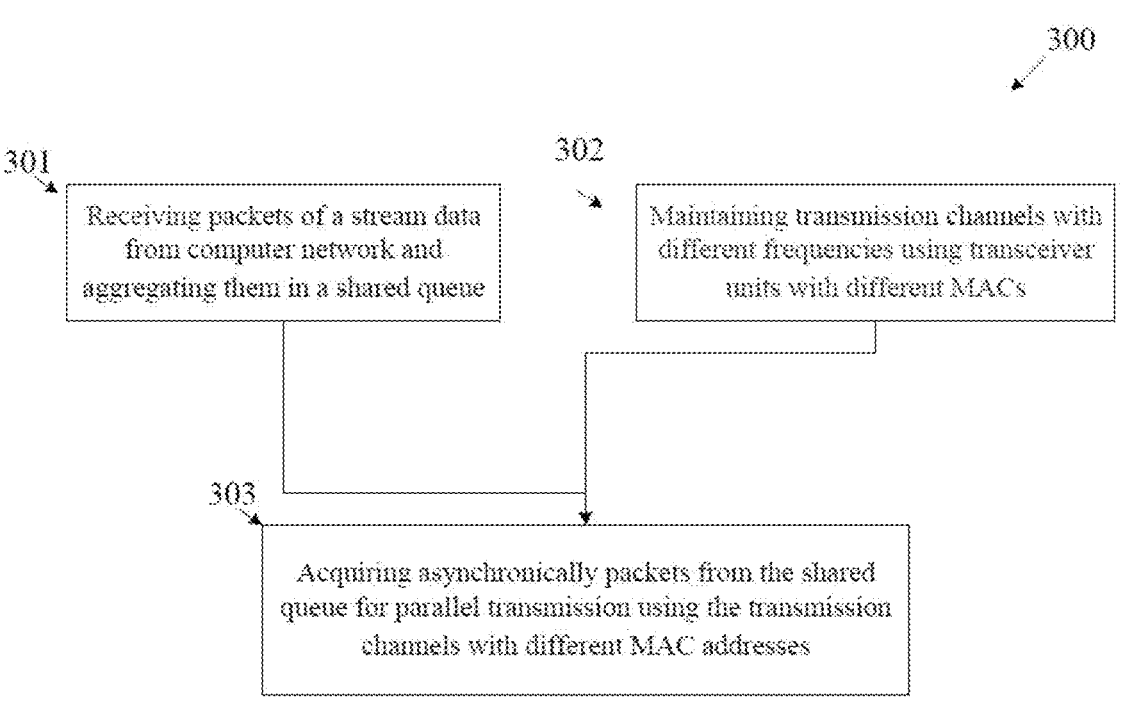
FIG. 2 is a flowchart of a method for operating an MRM device for wirelessly transmitting stream data received via a computer network to a remote target station, according to some embodiments of the present disclosure.

Reference is also made to FIG. 2 which is a flowchart of a method 300 for operating an MRM device for wirelessly transmitting stream data received via a computer network 90 to a remote target station such as a UE, according to some embodiments of the present disclosure.

As shown at 301, a plurality of packets of a stream data are received from the computer network 90 and aggregated in the shared queue.

As shown at 302, each of the transceiver modules 101, 102 of the MRM device is operated independently to maintain simultaneously the transmission channels 250 with common target user equipment which is wirelessly connected to the MRM device, each one of the plurality of transmission channels having a different frequency. As shown at 303, in use, the plurality of transceiver modules is operated separately to acquire asynchronously one or more of the plurality of packets from the shared queue for a parallel transmission in the plurality of transmission channels. These packets are then transmitted, for instance based on a WLAN protocol. Each packet maybe encoded with a WI-FI header complying with 802.11xx protocol.

As all the packets are originated from the shared queue, packets of the data stream are not duplicated in the process (remain unduplicated).

Optionally, the controller 106 of each of the transceiver modules 101 manages a separate traffic flow control mechanism so that packets transmitted in the respective transmission channel 250 are assigned with MRM sequence numbers of the specific traffic flow control. Optionally, the queue manager 104 manages retries in the transmission channels 250 independently from the transceiver modules 101. Optionally, the queue manager 104 manages aging of packets transmitted in the transmission channels 250 independently from the transceiver modules 101. Optionally, the queue manager 204 manages Rx reordering independently from the transceiver modules 101.

Optionally, the controller 106 of each of the transceiver modules 101 manages content of a BA control field to include a WI-FI™ sequence number, for instance as defined in existing WLAN standards such as 802.11a/n/ac/ax.

According to some embodiments of the present disclosure, the controller 106 of each of the transceiver modules 101 identifies failed transmission of package(s) on the transmission channel 250 it manages and returns them to the shared queue. For instance, when EDCA mechanism is executed, the failed transmission of packages may be identified per TxOP. Optionally, the controller 106 determines whether to return the package(s) identified as failed to be transferred to the shared queue in the memory 103 or to perform a retry, for instance as defined in existing WLAN standards such as 802.11a/n/ac/ax based on presence or absence of a BA timeout. For instance, when BA timeout is detected, a failed transmission is assumed respective packets are returned to the shared queue with or without sending block acknowledgement request (BAR) as defined in existing WLAN standards such as 802.11n/ac/ax. Optionally, the returned packets are returned to a place in the shared queue according to their MRM sequence numbers. In such a manner, time-based transmission priority such as first in first out can be maintained.

According to some embodiments of the present disclosure, in use, each of the transceiver modules 101 is adapted to receive messages indicative of missing packets from the respective transceiver module 101 it communicates with. In such embodiments, in response to receiving these messages, the transceiver modules 101 independently access the shared queue to try to acquire and retransmit the missing packets. Optionally, the queue manager receives indication(s) about the missing packets from the transceiver module(s) 201 and locates the missing packets in the front of the shared queue (in response to the receipt of the missing packet indications).

Figure 3:
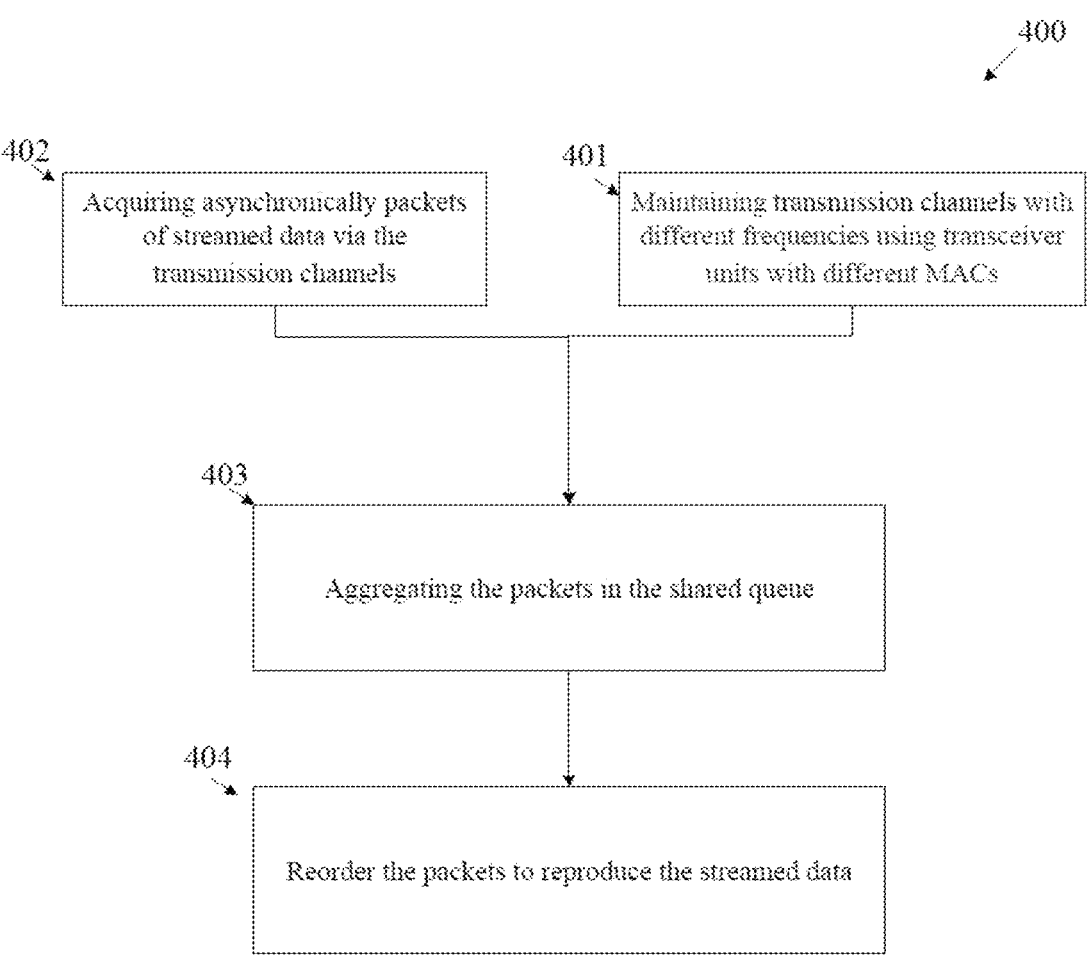
FIG. 3 is a flowchart of a method of operating a target station with a multi-channel process wherein a plurality of transceiver units asynchronously acquires packets of streamed data transmitted in different frequencies from sources with different MAC addresses, according to some embodiments of the present disclosure.

Reference is also made to FIG. 3, which is a flowchart 400 of a method of operating a target station, for example UE, such as 200, with a multi-channel process wherein a plurality of transceiver units, such as 202, asynchronously acquire packets of streamed data transmitted in different frequencies from sources with different MAC addresses, according to some embodiments of the present disclosure. The 401-404 are performed at the target station side.

As shown at 401, multiple transceiver modules, for instance 201, are assigned with different MAC addresses for establishing the transmission channels 250, for instance as described above. The transmission channels are maintained simultaneously and having different frequencies as described above.

As shown at 402, the plurality of transceiver modules is operated to acquire the packets via the plurality of transmission channels which are established and maintained simultaneously. Each of the transceiver modules is operated separately for acquiring some of the packets of the streamed data in a non-synchronic manner.

Optionally, the controller 206 of each of the transceiver modules 201 manages a separate traffic flow control mechanism so that packets received in the respective transmission channel 250 are received independently from the packets received in other transmission channel(s). Optionally, the controller 206 of each of the transceiver modules 201 tracks received packets and send indication of missing packets, for instance in a BA control field independently from the data flows received by other transceiver modules 201. Optionally, the controller 206 of each of the transceiver modules 101 input the received packets into the shared queue.

As shown at 403, the plurality of packets of stream data which are received using the transceiver modules are optionally aggregated in the shared queue also referred to as a shared reordering queue. Optionally, each of the plurality of transceiver modules 201 adds packets to the shared queue while ignoring BA window limitations and missing packets. Optionally, each of the plurality of transceiver modules 201 responds to the received packets with a BA dataset indicating received status per packet; the BA dataset is transmitted over the respective transmission channel. In such a manner, the receiving transceiver modules 101 may identify when sent packets have not been arrived, classify them as missing packets and return to the shared queue that is stored in the memory 103 of the MRM device. In such a manner, the missing packets can be retransmitted via the same transmission channel or via other transmission channel(s) with different frequency(ies) by the other transceiver modules 101.

Now, as shown at 404, the packets are reordered to reproduce the streamed data, for instance according to their MRM sequence numbers. This allows processing the streamed data for display. This allows outputting the streamed data for presentation (or any other application) by the UE or devices connected to the UE. For example, the streamed data can be presented on a VR headset, displayed on a screen of the UE and/or casted on any presentation means. Optionally, the streamed data can be processed by any application without adaptation or further decoding as the reordered packets are arranged in the original sequence of the streamed data and at the same encoding.

Figure 4A:
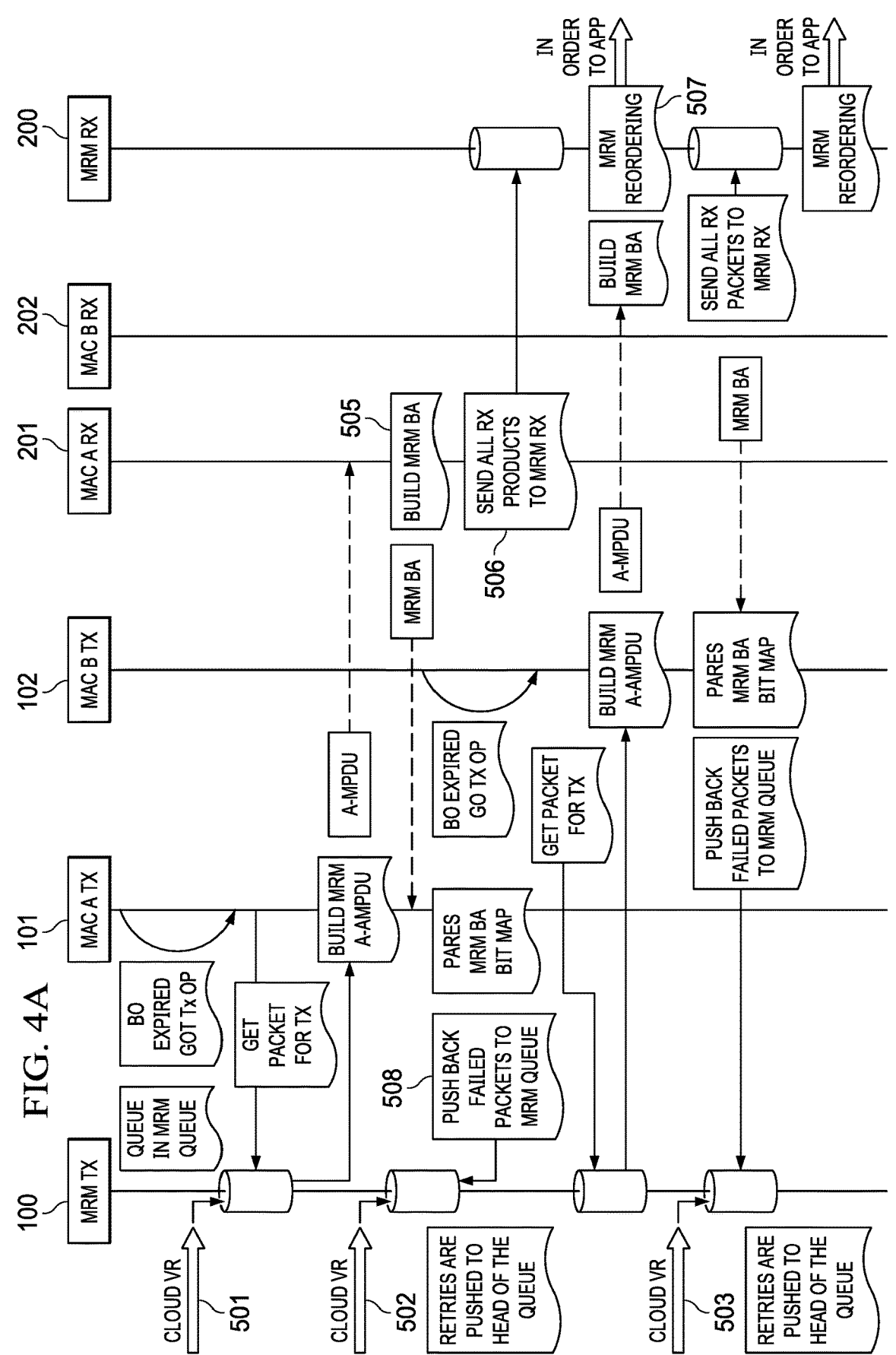
FIG. 4A and FIG. 4B are sequence charts of processes wherein packets of streamed data are transmitted via different channels, for instance from an MRM device to a target station as defined above, for instance in FIGS. 1-3, according to some embodiments of the present disclosure.
Figure 4B:
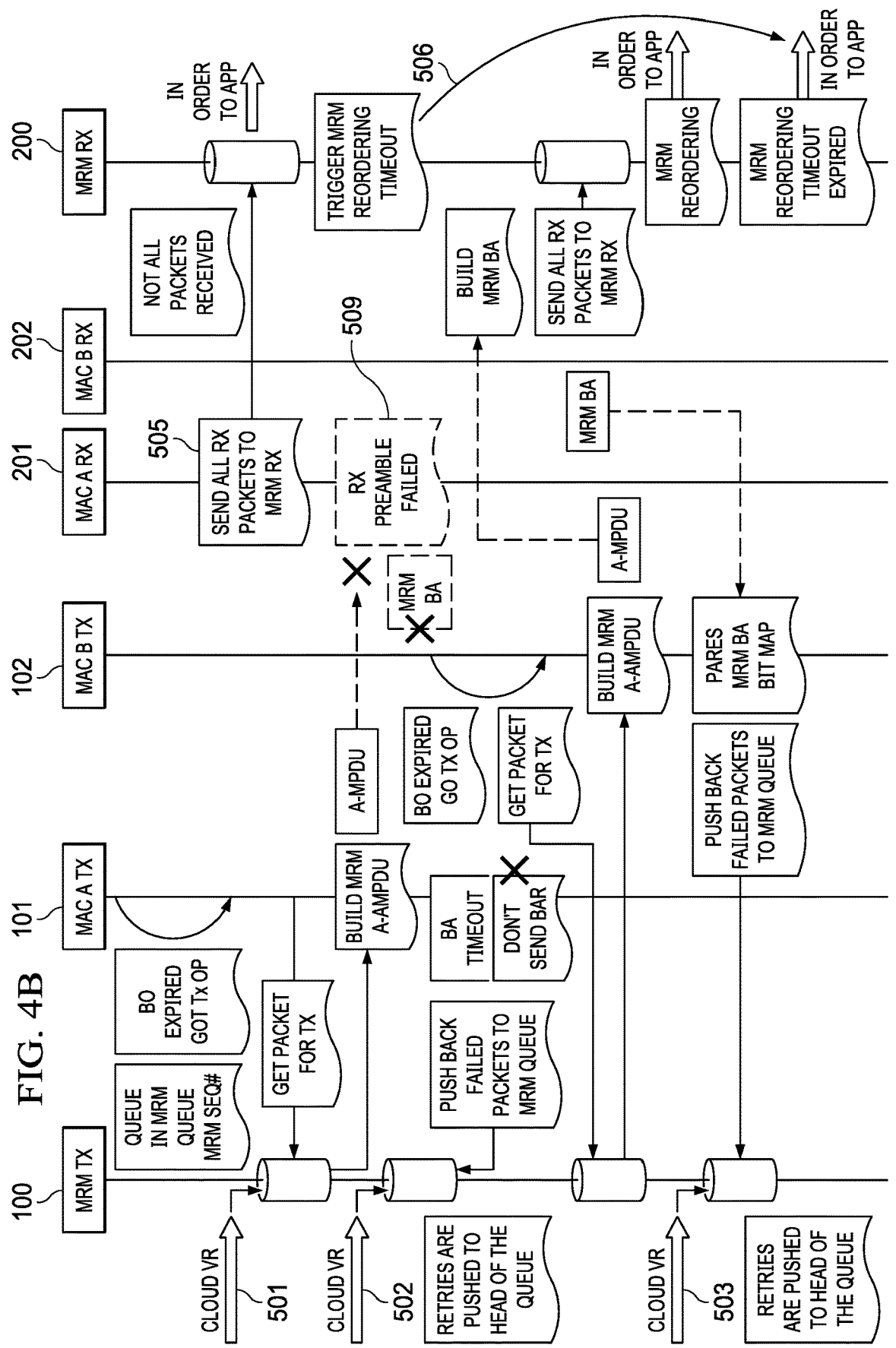

Reference is now made to FIGS. 4A and 4B are sequence charts of processes wherein packets of streamed data are transmitted via different channels, for instance from an MRM device 100 to a target station 200 as defined above, for instance in FIGS. 1-3, according to some embodiments of the present disclosure.

As shown at 501, 502, and 503, packets of streamed data are added to the shared queue at the MRM device 100, for instance packets pushed to the shared queue by a UDP server, for instance a server which is part of a VR cloud.

While packets are pushed at a first in first out scheme, retries packets are pushed to the head of the queue, for instance as described above.

In use, as indicated above, while the packets are being pushed to the shared queue, the MRM device 100 generates and adds MRM sequence numbers to packets, for instance in a new field at WI-FI header or any new tag. One of the transceiver modules, marked as Tx $MAC_n$, has a TxOP (e.g., back off (BO) value expired and clear channel assessment (CCA) value OK) acquires packets from the shared queue for packet aggregation, e.g., in A-MPDU. The Tx $MAC_n$ performs the aggregation while ignoring BA window limitations (e.g., Starting Sequence Number (SSN) and BA agreement are at max window size).

As shown at 505, one of the transceiver modules 201, 202 of the target station 200, marked herein as Rx $MAC_n$, builds and returns BA bitmap indicating receiving (Rx) status per packet where SSN is a first packet in current aggregation. The Rx $MAC_n$ forwards the received packets to the MRM reordering queue optionally without any reordering action. As shown at 506, optionally when a missed packet is detected, the reordering queue is updated. The queue manager of the target station performs reordering based on the MRM sequence number 507 (e.g., in a similar manner to a MAC reordering function, optionally using window and wrap around sequence number).

As shown at 508, when the Tx $MAC_n$ receives the BA bitmap failed packets are pushed back to the front of the shared queue for retry by any of the transceiver units 101, 102 (e.g., the same transceiver unit or any other transceiver unit). In case BA Timeout is detected the Tx $MAC_n$ is not sending BAR as reordering is not done at the low MAC level but by the queue manager 204 of the target station level 200.

It should be noted that when any of the processes described in FIGS. 2-4B are implemented no retries of packets may be reported by the application layer as retries are performed at the MAC level. Also, BAR messages may not send by the multiple transceiver modules 101, 102 when BA messages are not received on last aggregation events. Also new aggregation such as A-MPDU with new packets retrieved from the shared queue (retries or new) is performed after BA timeout is sent with next WI-FI Sequence number, see for example 509.

Figure 5:
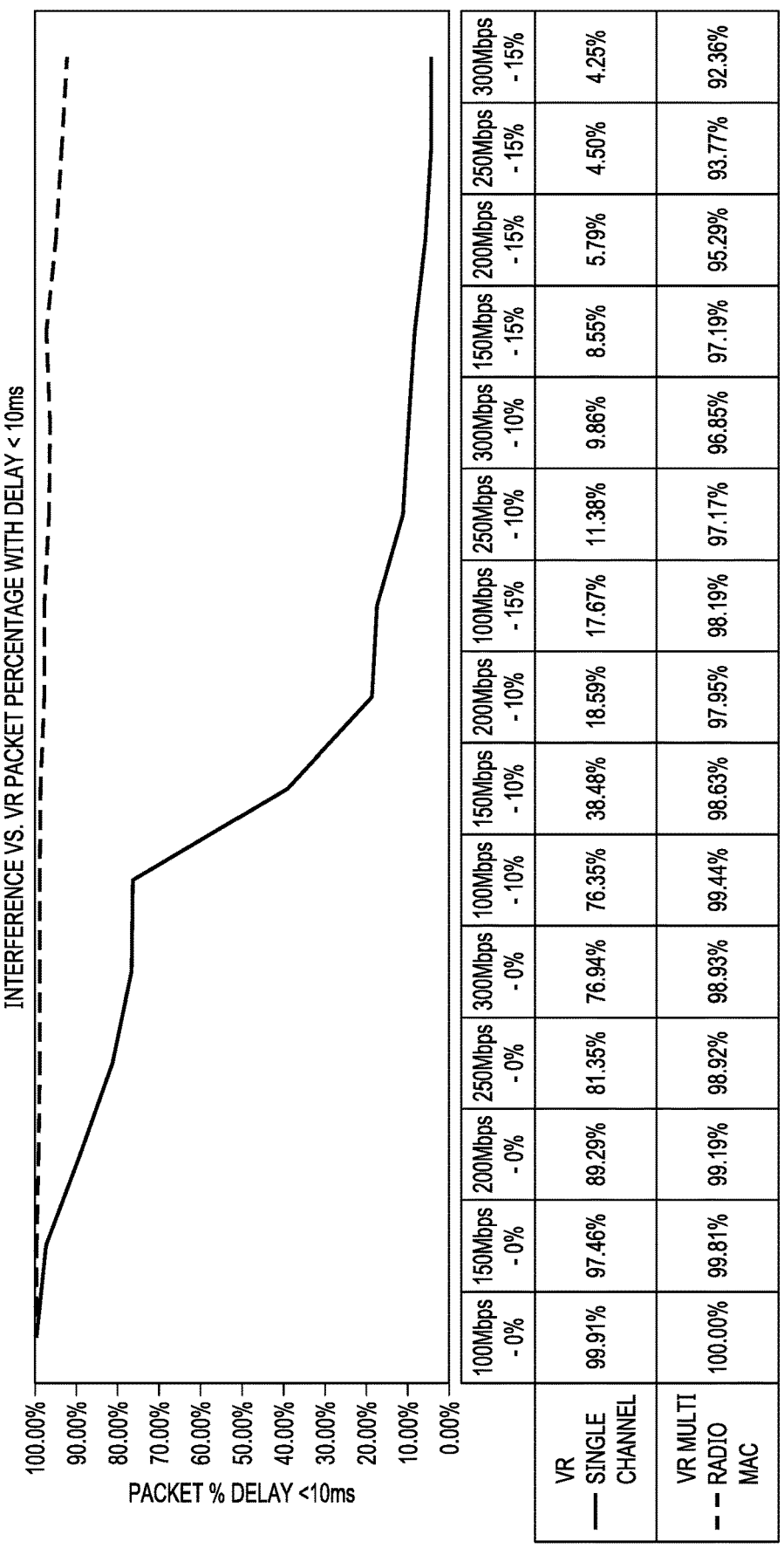
FIG. 5 is a graph showing a comparison between delay caused by applied variable interference in various scenarios, including a scenario implementing the hardware depicted in FIG. 1, according to some embodiments of the present disclosure.
Figure 6A:
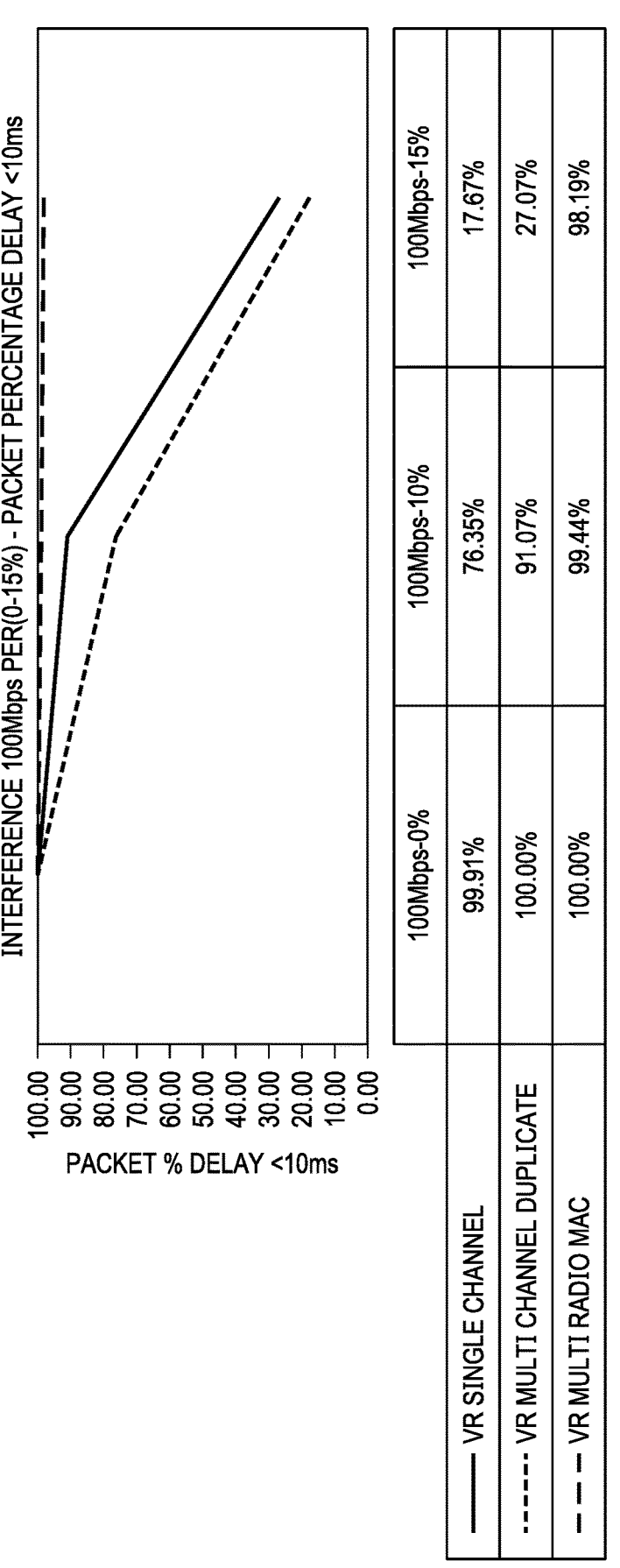
FIG. 6A, FIG. 6B, FIG. 6C, FIG. 6D, and FIG. 6E are graphs depicting a comparison between the delay caused by applied variable interference at various megabits per second (Mbps) in 3 different scenarios, including a scenario implementing the hardware depicted in FIG. 1, according to some embodiments of the present disclosure.
Figure 6B:
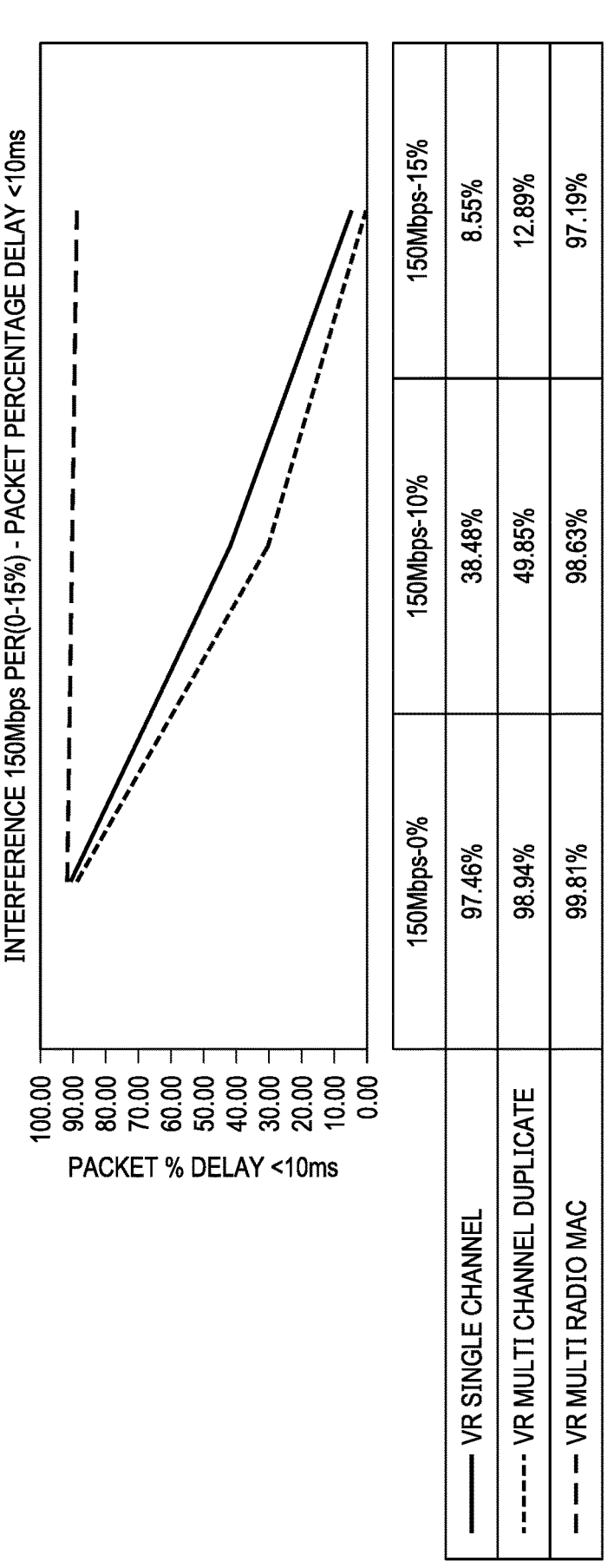
Figure 6C:
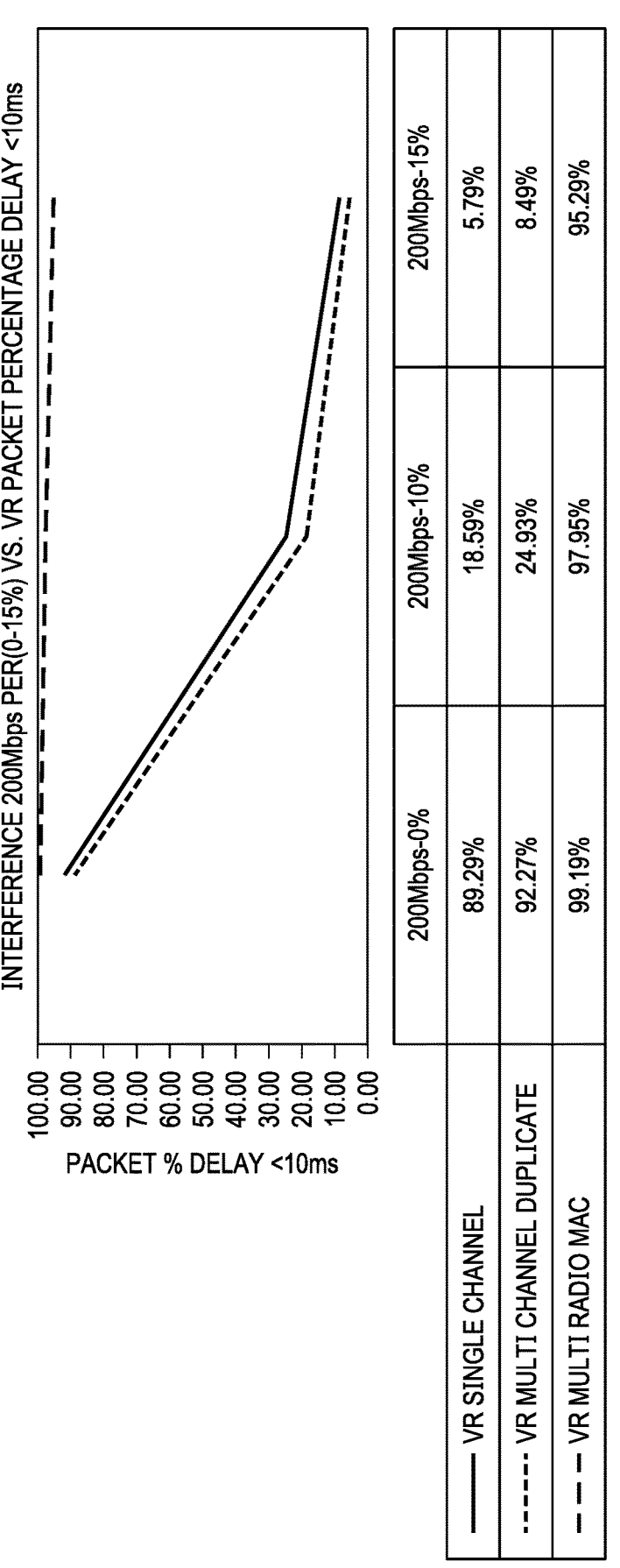
Figure 6D:
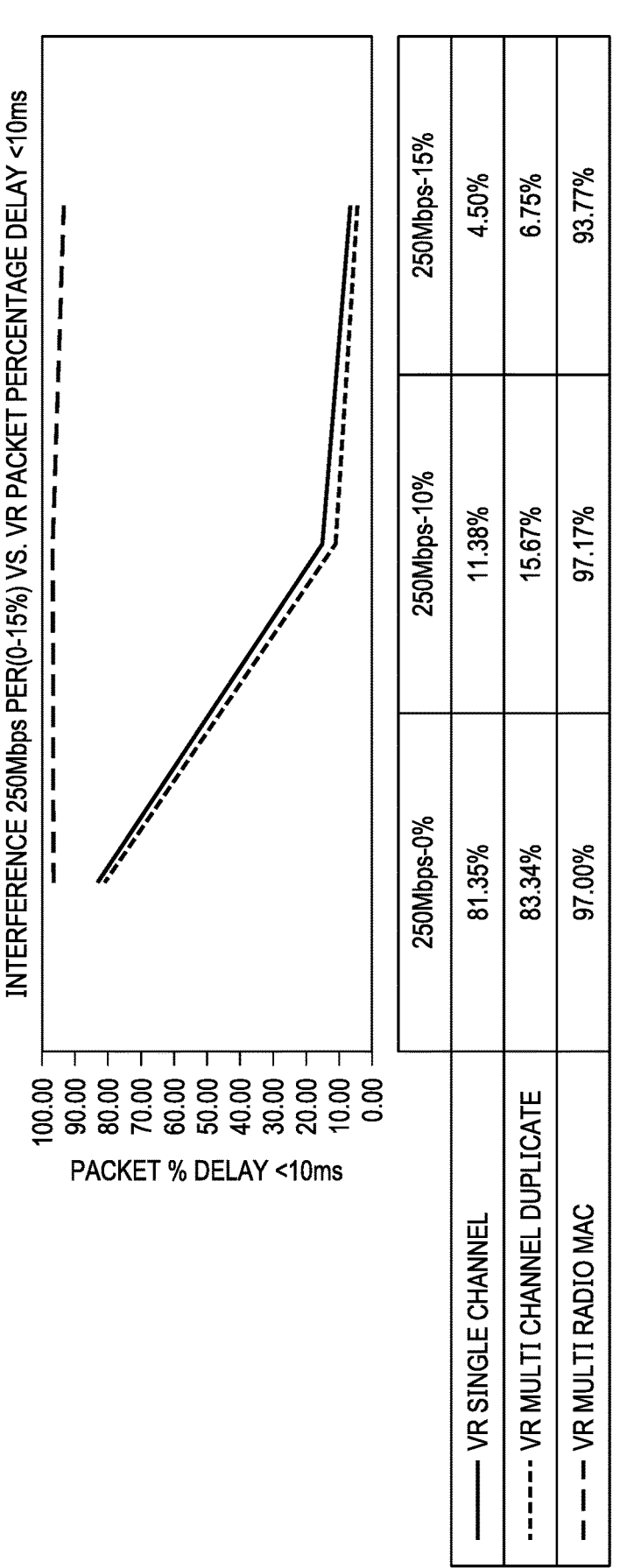
Figure 6E:
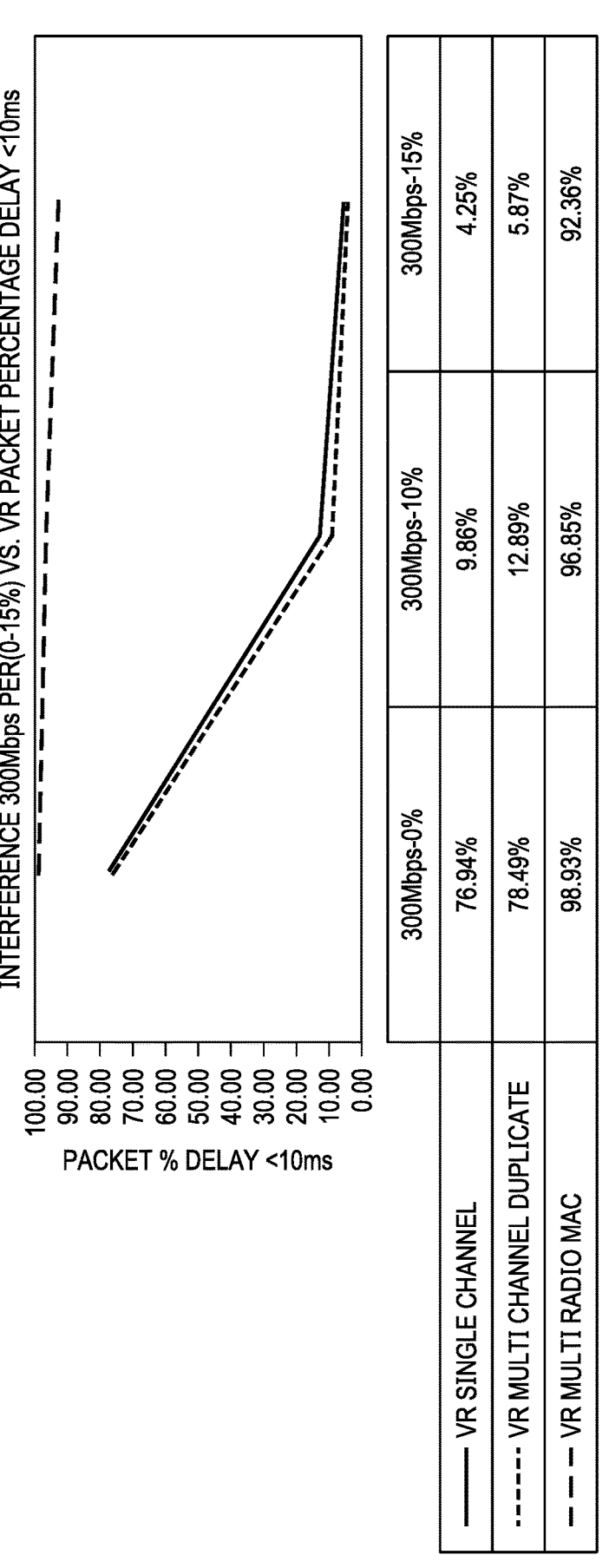

Reference is now made to an exemplary use case wherein the same VR data was transmitted in a first scenario—from a single channel AP to a UE and in a second scenarios—from an MRM device defined as described with reference to FIGS. 1 and 2 to a UE defined as described with reference to FIGS. 1 and 3. In this comparison, the used MRM device used a transceiver unit transmitting at a high channel of 138@80 MHz and another transceiver unit transmitting at a low channel of 42@80 MHz, and the single channel AP used a transceiver unit transmitting at a channel of 106@80 MHz. OBSS time sharing interference was applied by AP transmitting at a channel 42@80 MHz and AP transmitting at a channel 138@80 MHz. FIG. 5 is a graph showing a comparison between the delay caused by applied variable interference in both scenarios. This graph clearly shows how the OBSS time sharing interference almost has no effect in the second scenario implementing aspects of the disclosures. Reference is also made to FIGS. 6A-6E which are graphs depicting a comparison between the delay caused by applied variable interference at various Mbps in 3 different scenarios. The first and second scenarios are based on hardware as used in the above first and second scenarios and in the third scenario that hardware includes a target station and an AP that duplicates the streamed data for transmission over different channels with different frequencies, for instance as used in the second scenario. This graph clearly shows how the OBSS time sharing interference almost has no effect in the second scenario implementing aspects of the disclosures and how merely duplicating the data for parallel transmission does not reduce the delay much. In the exemplary use cases described in FIGS. 6A-6E 97.43% (Standard Deviation of 2.19%) of the examined packets, on average (over 120 million (M) packets) were received with a delay of less than 10 milliseconds (ms). Also, usage of multiple channels with only data duplication has shown only minor gain in few use cases.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a transceiver, a processor, and a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have disclosed all the possible subranges as well as individual numerical values within that range. For example, description of a range such as from 1 to 6 should be considered to have disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A multi radio media access control (MAC) (MRM) transceiver comprising:
   a memory configured to store, in a shared queue, a plurality of packets of a data stream; and
   a plurality of transceiver systems, wherein each of the transceiver systems has a different MAC address and is configured to:
      asynchronously acquire one or more of the packets from the shared queue for transmission;
      transmit the one or more of the packets in one of a plurality of transmission channels, wherein each of the transmission channels has a different frequency, and wherein the MRM transceiver is configured to maintain the transmission channels for simultaneous transmission of the plurality of packets to a common target station that is wirelessly coupled to the MRM transceiver, wherein each of the plurality of packets has a field encoding an MRM sequence identifier to be decoded by the common target station for packet reordering; and
      wherein each of the transceiver systems comprises a controller configured to identify failed transmission of the one or more of the packets on a transmission channel of a transceiver system managed by the controller, and return the one or more of the packets that failed transmission to the shared queue, wherein the one or more of the packets that failed transmission are returned to a place in the shared queue according to their MRM sequence identifier.

2. The MRM transceiver of claim 1, further comprising a queue manager configured to manage aging of the plurality of packets stored in the shared queue independently from the plurality of transceiver systems.

3. The MRM transceiver of claim 1, wherein each of the transceiver systems is configured to execute an aggregation process for a group of packets acquired from the shared queue to be transmitted together in a single transmission.

4. The MRM transceiver of claim 1, wherein each of the transceiver systems is configured to:

receive, over a corresponding parallel transmission channel, messages indicative of missing packets; and forward an indication of the missing packets to a queue manager of the shared queue.

5. The MRM transceiver of claim 4, wherein a first transceiver system in the plurality of transceiver systems is configured to acquire, from the shared queue, one or more packets identified as missing by a second transceiver system in the plurality of transceiver systems.

6. The MRM transceiver of claim 5, further comprising a processing circuitry configured to add the one or more packets identified as missing to a front of the shared queue in response to receiving the messages.

7. The MRM transceiver of claim 1, wherein each of the packets comprises a WI-FI header complying with an Institute of Electrical and Electronics Engineers (IEEE) 802.11xx protocol.

8. The MRM transceiver of claim 1, wherein the plurality of transceiver systems comprises a first transceiver system and a second transceiver system, wherein the first transceiver system is configured to transmit in a first frequency of 5 gigahertz (GHz) low band, and wherein the second transceiver system is configured to transmit in a second frequency of 5 GHz high band.

9. The MRM transceiver of claim 1, wherein the plurality of transceiver systems comprises a first transceiver system and a second transceiver system, wherein the first transceiver system is configured to transmit in a first frequency of less than 3 gigahertz (GHz), and wherein the second transceiver system is configured to transmit in a second frequency of more than 4 GHz.

10. The MRM transceiver of claim 9, wherein the plurality of transceiver systems comprises a third transceiver system and a fourth transceiver system, wherein the third transceiver system is configured to transmit in a third frequency of more than 4 GHz, and wherein the fourth transceiver system is configured to transmit in a fourth frequency of less than 5 GHz.

11. The MRM transceiver of claim 1, wherein the data stream is an unduplicated data stream, and wherein the packets are unduplicated packets.

12. A method implemented by a multi radio media access control (MAC) (MRM) transceiver, the method comprising:

receiving, via a computer network, a plurality of packets of a data stream;

storing the plurality of packets in a shared queue;

simultaneously maintaining, using a plurality of transceiver systems of the MRM transceiver, a plurality of transmission channels with a common target user equipment (UE) that is wirelessly coupled to the MRM transceiver, wherein each of the transmission channels comprises a different frequency;

asynchronously acquiring, by the transceiver systems, one or more of the packets from the shared queue for a parallel transmission in the transmission channels;

transmitting the one or more of the packets in one of a plurality of transmission channels, wherein each of the transmission channels has a different frequency, and wherein each of the plurality of packets has a field encoding an MRM sequence identifier for packet reordering;

identifying failed transmission of the one or more of the packets; and returning the one or more of the packets that failed transmission to the shared queue, wherein the one or more of the packets that failed transmission are returned to a place in the shared queue according to their MRM sequence identifier.

13. The method of claim 12, further comprising managing aging of the plurality of packets stored in the shared queue independently from the plurality of transceiver systems.

14. The method of claim 12, further comprising operating each of the transceiver systems to execute an aggregation process for a group of packets acquired from the shared queue to be transmitted together in a single transmission.

15. The method of claim 12, further comprising:

receiving, by each of the transceiver systems over a corresponding parallel transmission channel, messages indicative of missing packets; and forwarding, by each of the transceiver systems, the messages to a queue manager of the shared queue.

16. The method of claim 15, further comprising adding the one or more packets identified as missing to a front of the shared queue in response to receiving the messages.

17. The method of claim 12, wherein the plurality of transceiver systems comprises a first transceiver system and a second transceiver system, wherein the first transceiver system is configured to transmit in a first frequency of 5 gigahertz (GHz) low band, and wherein the second transceiver system is configured to transmit in a second frequency of 5 GHz high band.

18. The method of claim 12, wherein the plurality of transceiver systems comprises a first transceiver system and a second transceiver system, wherein the first transceiver system is configured to transmit in a first frequency of less than 3 gigahertz (GHz), and wherein the second transceiver system is configured to transmit in a second frequency of more than 4 GHz.

19. The method of claim 12, wherein the data stream is an unduplicated data stream, and wherein the plurality of packets are unduplicated packets.

20. The method of claim 12, wherein each of the packets comprises a WI-FI header complying with an Institute of Electrical and Electronics Engineers (IEEE) 802.11xx protocol.

\* \* \* \* \*